US008948166B2

(12) United States Patent
Leigh

(10) Patent No.: US 8,948,166 B2
(45) Date of Patent: Feb. 3, 2015

(54) SYSTEM OF IMPLEMENTING SWITCH DEVICES IN A SERVER SYSTEM

(75) Inventor: Kevin B. Leigh, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1291 days.

(21) Appl. No.: 11/554,294

(22) Filed: Oct. 30, 2006

(65) Prior Publication Data

US 2007/0294433 A1   Dec. 20, 2007

Related U.S. Application Data

(60) Provisional application No. 60/813,752, filed on Jun. 14, 2006.

(51) Int. Cl.
*H04L 12/50* (2006.01)
*H04L 12/933* (2013.01)
*H04L 12/931* (2013.01)
*H04L 12/935* (2013.01)

(52) U.S. Cl.
CPC ............... *H04L 49/10* (2013.01); *H04L 49/00* (2013.01); *H04L 49/30* (2013.01); *H04L 49/40* (2013.01); *H04L 49/45* (2013.01)
USPC ........................................................ 370/386

(58) Field of Classification Search
USPC ............... 370/351, 360; 327/526; 710/302; 708/108
See application file for complete search history.

(56) References Cited

U.S. PATENT DOCUMENTS

| 6,325,636 | B1 * | 12/2001 | Hipp et al. ...................... 439/61 |
| 6,611,853 | B2 * | 8/2003 | Graafmans ................... 708/108 |
| 6,621,828 | B1 * | 9/2003 | Field et al. .................... 370/466 |
| 6,816,590 | B2 * | 11/2004 | Pike et al. ...................... 379/329 |
| 6,976,112 | B2 * | 12/2005 | Franke et al. ................. 710/302 |
| 7,142,884 | B2 * | 11/2006 | Hagn .......................... 455/552.1 |
| 7,554,931 | B2 * | 6/2009 | Zhou et al. .................... 370/254 |
| 2002/0173869 | A1 * | 11/2002 | Graafmans ................... 700/108 |
| 2005/0262392 | A1 * | 11/2005 | Irving .............................. 714/11 |
| 2005/0272288 | A1 * | 12/2005 | Chapman et al. ............. 439/135 |
| 2006/0098016 | A1 * | 5/2006 | Chou et al. .................... 345/501 |
| 2006/0173986 | A1 * | 8/2006 | Ikeda et al. ................... 709/223 |
| 2007/0047536 | A1 * | 3/2007 | Scherer et al. ................ 370/360 |
| 2007/0141895 | A1 * | 6/2007 | Karstens ....................... 439/490 |
| 2007/0205822 | A1 * | 9/2007 | Jovanovich et al. .......... 327/526 |
| 2007/0294433 | A1 * | 12/2007 | Leigh ............................ 709/250 |
| 2008/0123552 | A1 * | 5/2008 | Slaton ........................... 370/254 |

* cited by examiner

*Primary Examiner* — Marsha D Banks Harold
*Assistant Examiner* — Christopher Wyllie

(57) ABSTRACT

A system of implementing switch devices in a server system. At least some of the illustrative embodiments are systems comprising a plurality of servers coupled to a midplane board, and a first and second switch slots (where each switch slot enables coupling of a switch device to the midplane board). The first and second switch slots accept switch devices one each in each switch slot, and the first and second switch slots accept a single switch device spanning both switch slots.

9 Claims, 3 Drawing Sheets

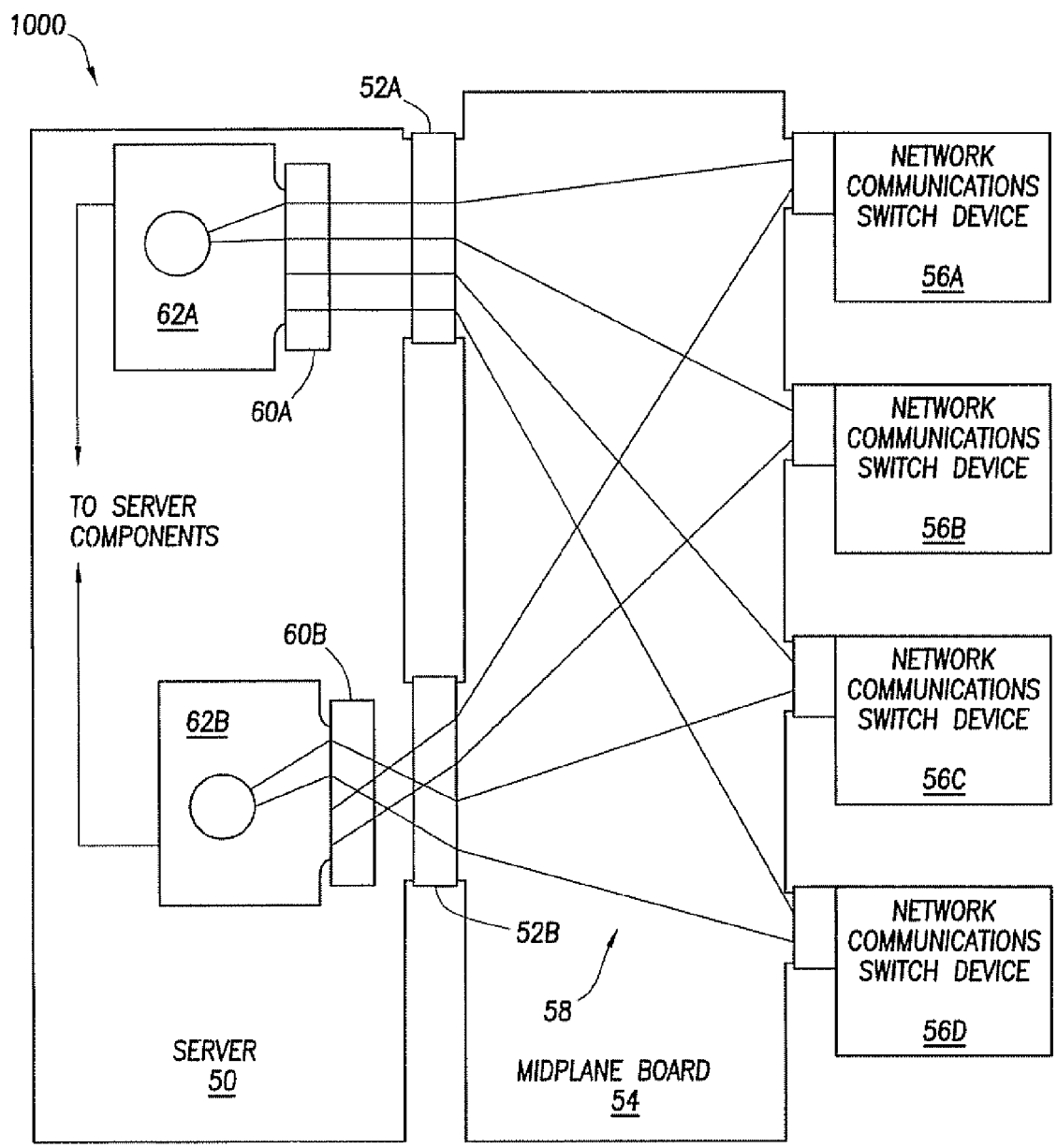
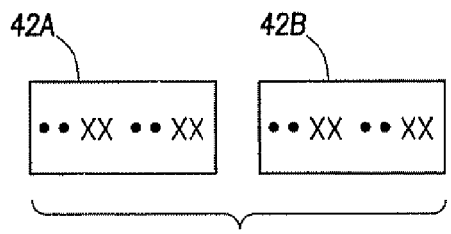
FIG.5
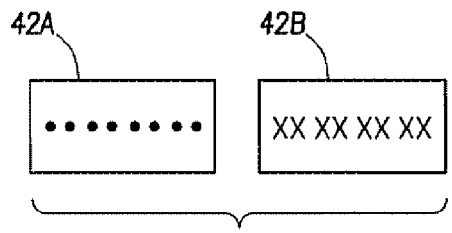
FIG.6

SYSTEM OF IMPLEMENTING SWITCH DEVICES IN A SERVER SYSTEM

CROSS-REFERENCE TO RELATED APPLICATIONS

This application claims the benefit of provisional patent application Ser. No. 60/813,752, filed Jun. 14, 2006, titled "Methods to Minimize Backplane and Enclosure Complexity for Modular Servers," which application is incorporated by reference herein as if reproduced in full below,

BACKGROUND

A major component of electronic information access and retrieval is network accessible computer systems known as servers. High density servers (also known as blade servers) are implemented in "enclosures" mounted within racks. The servers electrically couple to a first side of a midplane board within the enclosure, and switch devices couple to a second side of the midplane board, thus forming complete server systems.

By way of the midplane board, the servers may couple to multiple types of switch devices. One type of switch device is a network switch device, which acts to perform message routing for a communication network. The servers communicate with the network switch devices across the midplane board using communication-based protocols, such as Ethernet.

Other switch devices with which the servers may communicate are storage switch devices. The servers themselves may have no, or relatively little, onboard hard drive storage space The hard drive storage space is made accessible to the servers through the storage switch devices coupled to the midplane board. The servers communicate with storage switch devices across the midplane board using storage-based protocols, such as Fibre Channel®, Serial Attached SCSI (SAS), and may also communicate with storage devices using other non-storage-based protocols, such as Peripheral Components Interconnect express (PCIe).

Yet still other switch devices with which the servers may communicate are parallel computing switch devices, which switch devices network the servers together for purposes of parallel computing. The servers communicate with parallel computing switch devices across the midplane board using cluster-networking protocols, such as InfiniBand®.

In order to support the possible switch devices to which the servers may need to communicate, the midplane board implements dedicated slots and signal paths for each type communication protocol. For example, a slot (and its respective connector on the midplane board) may be dedicated only to InfiniBand communication, and no other switch device will be operable in the slot. Creating dedicated slots and signal paths limits flexibility of a single enclosure, and may require manufactures to create multiple midplane boards and enclosures to support the differing needs of consumers

BRIEF DESCRIPTION OF THE DRAWINGS

For a detailed description of exemplary embodiments, reference will now be made to the accompanying drawings in which:

FIG. 4 shows in greater detail a midplane board in accordance with at least some embodiments;

FIG. 5 shows an illustrative distribution of electrical connections across two connectors in accordance with some embodiments; and FIG. 6 shows an illustrative distribution of electrical connections across two connectors in accordance with alternative embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either: an indirect, direct, optical or wireless electrical connection; or an indirect or direct mechanical connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
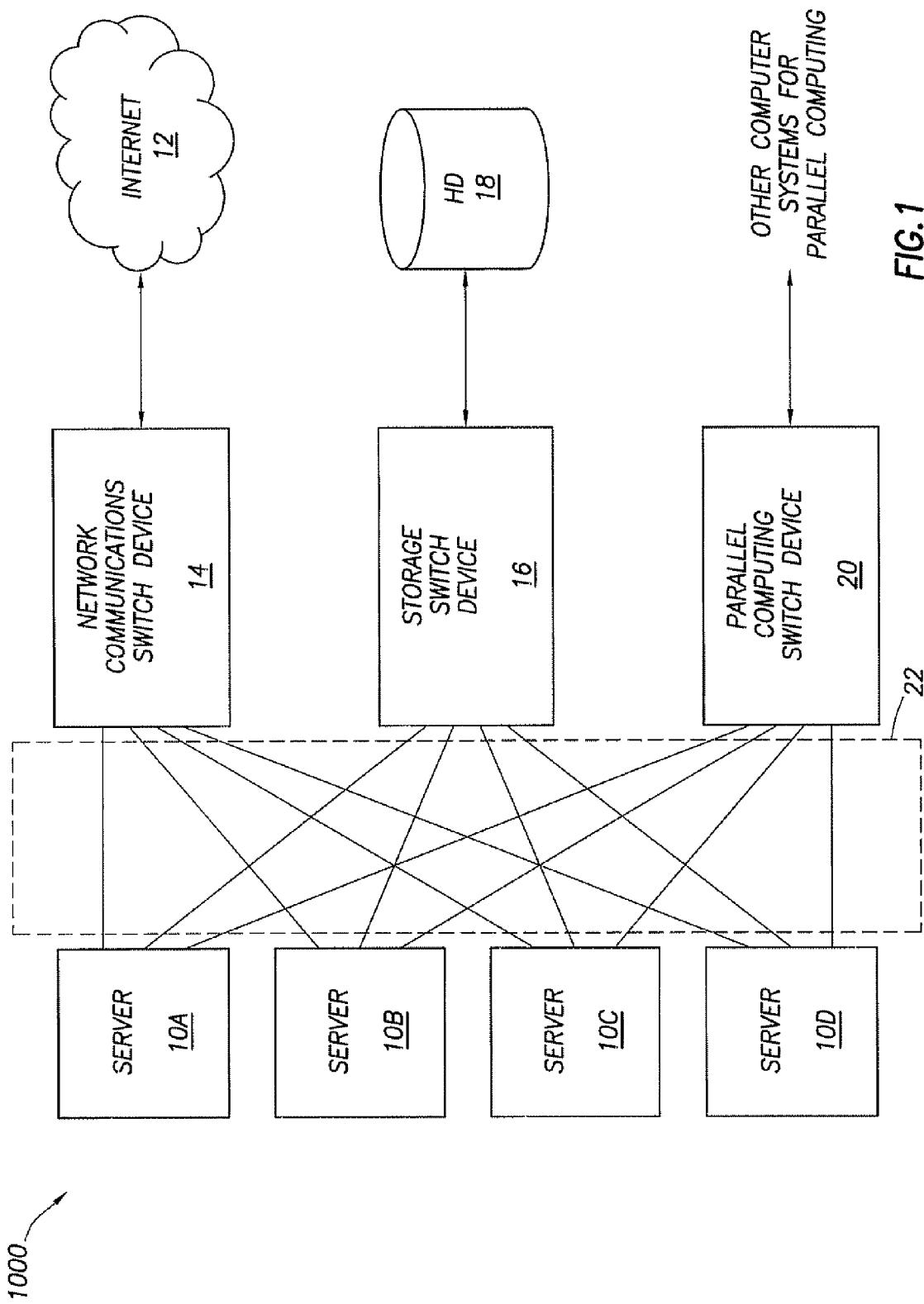
FIG. 1 shows a server system in accordance with at least some embodiments.

FIG. 1 illustrates a computing system 1000 in accordance with at least some embodiments. The computing system 1000 comprises a plurality of servers 10. Although only four servers 10 are shown, any number of servers may reside within an enclosure (e.g., 8, 10, 14, 16, 32). Each server 10 is a computer system comprising one or more processors and memory. The servers 10 may be, for example, web servers hosting an online shopping network website, in which case the servers 10 supply requested web pages to customers, and possibly perform online commerce functions.

Regardless of the precise function of the servers 10, the servers 10 may communicate with other devices to implement the desired functionality. In order to communicate with other computer systems connected to the Internet 12, the servers 10 may couple to a network communications switch device 14. Although only one network communications switch device 14 is shown, any number of network communication switch devices 14 may be implemented (e.g., a number such that each server 10 couples to two different network communication switch devices for purposes of fault tolerance). The network communications switch device may perform message packet routing between the Internet 12 and the servers 10. The servers 10 communicate with the network communications switch device 14 by way of a network communication protocol (e.g., Ethernet protocol).

In some embodiments the servers 10 implement little or no on-board long term non-volatile storage (erg., hard drive space), and thus in order to have access to long term non-volatile storage the servers 10 may couple to a storage switch device 16 Although only one storage switch device 16 is shown, any number of storage switch devices 16 may be implemented. The storage switch device 16 in turn couples to long term non-volatile storage, such as an internal or external hard drive 18. In some embodiments, the storage switch device 16 couples to a plurality of hard drives and implements a redundant array of independent (or inexpensive) disks (RAID) for purposes of fault tolerance with respect to drive failure. The servers 10 communicate with the storage switch device 16 using a storage communication-based protocol (e.g., Fibre Channel®, Serial Attached SCSI (SAS) or Peripheral Components Interconnect express (PCIe)).

In yet still other embodiments, the servers 10 participate in a parallel computing architecture, and thus may need to couple to each other and other computer systems in a specialized manner to implement the parallel computing In accordance with these embodiments, the servers 10 couple to a parallel computing switch device 20, which performs message-passing packet switching for parallel computing operations. The servers 10 communicate with the message-passing packet switching device 20 using a parallel computing communication-based protocol (e.g., InfiniBand®), RDMA-over-Ethernet).

Still referring to FIG. 1, while it may be possible to couple the servers 10 to the various switch devices 14, 16 and 20 by way of cabling, in accordance with the various embodiments the electrical connections between the servers 10 and the switch devices 14, 16 and 20 are made by way of electrical traces on a circuit board, which circuit board may be referred to as backplane board or a midplane board 22. In particular, each server 10 couples to the midplane board 22 by way of at least one connector. Likewise, each illustrative switch device 14, 16 and 20 couples to the midplane board 22 by way of at least one connector. The electrical traces extend between various connectors to provide a physical layer for the particular communication protocols implemented between the servers 10 and the illustrative switch devices 14, 16 and 20.

Figure 2:
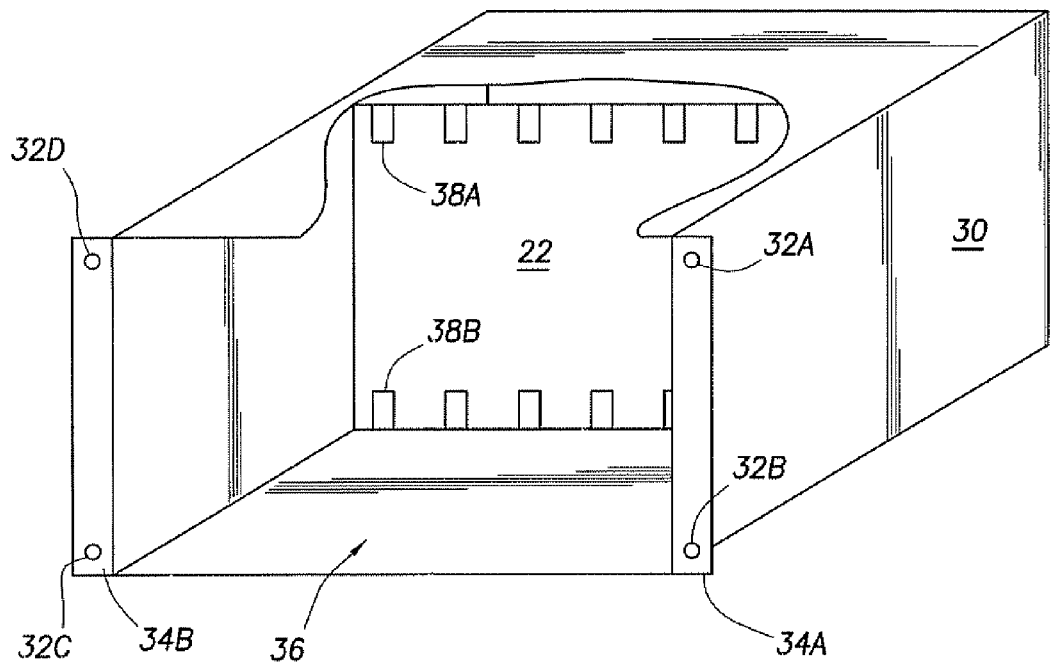
FIG. 2 shows a front perspective cut-away view of a server system in accordance with at least some embodiments.

FIG. 2 illustrates a front perspective cut-away view of a server enclosure in accordance with at least some embodiments. In particular, the enclosure 30 is designed and constructed to be installed in a rack (not specifically shown). The enclosure 30 may be held in placed in the rack by way of fasteners 32 through lips 34. The enclosure 30 defines an internal volume 36 into which server (or server blades) are inserted. The act of inserting a server into the enclosure couples the server to the midplane board 22 by way of one or more server connectors 38. Enclosures in accordance with the various embodiments may accept two different form factor servers, half-height and full-height. Two half-height servers may be inserted into a collimated slot, or a single full-height server may be inserted into a collimated slot. In the case of two half-height servers, each server couples to the midplane board 22 by way of a single connector 38. Consider, for example, that connectors 38A and 38B are two connectors within a single collimated slot. A full-height server inserted into the slot associated with connectors 38A and 38B couples to both connectors. By contrast, a half-height server inserted into the upper portion of the collimated slot associated with connectors 38A and 38B only couples to connector 38A. Likewise, a half-height server inserted into the lower portion of the collimated slot associated with connectors 38A and 38B only couples to the connector 38B.

In accordance with at least some embodiments, the enclosure 30 has eight collimated slots, thus accepting sixteen half-height servers, eight full-height servers, or combinations of full- and half-height servers. However, enclosure 30 may accommodate any number of servers, and the servers need not necessarily be in vertically oriented columns.

Figure 3:
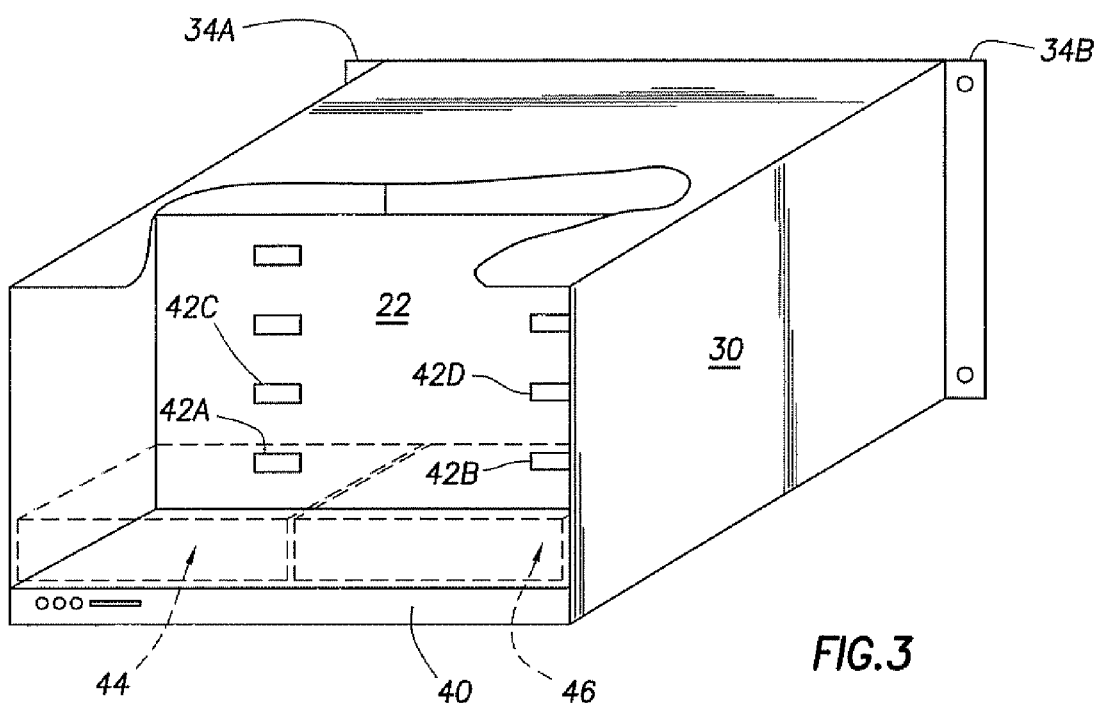
FIG. 3 shows a rear perspective cut-away view of a server system in accordance with at least some embodiments.

FIG. 3 illustrates a rear perspective cut-away view of the server enclosure 30. In particular, an enclosure manager 40 couples to the midplane board 22 within the enclosure 30. The enclosure manager 40 is a computer system which is responsible for internal operations of the enclosure, such as selectively powering servers, selectively powering switches, controlling power supplies that supply power to the enclosure, and allowing remote administration. The midplane board 22, in addition to connectors to couple to enclosure manager 40, also comprises a plurality of switch device connectors 42, which enable various switch devices to couple to the midplane board 22 and therefore the servers. The relationship of the connectors 42 and the enclosure 30 define a plurality of slots into which switch devices may be inserted. For example, connector 42A is associated with a first slot 44, while connector 42B is associated with a second slot 46. For purposes of this disclosure, the slot associated with a single switch device connector 42 is referred to as a single-wide slot. As discussed more fully below, in the various embodiments switch devices may be inserted into and occupy either a single-wide slot 44, 46, or switch devices may be inserted into and occupy two single-wide slots 44, 46, in which case the slots considered together are said to be a double-wide slot accepting a double-wide switch device. In yet further embodiments, switch devices may be inserted into and occupy four single-wide slots (e.g., 44 and 46, and the two slots immediately above 44 and 46), in which case the slots together are said to be a double-wide, double-high slot accepting a double-wide, double-high switch device.

The physical layer connections used by each communication protocol may differ not only as between the different protocols, but also within a protocol Considering first the network communication protocols, some Ethernet communications (e.g., 1000-Base-KX and 10G-Base-KR) utilize four electrical traces at the physical layer for communication (the four traces being two differential communication pairs comprising one differential receive pair and one differential transmit pair). However, 10G-Base-KX4 Ethernet uses sixteen electrical traces at the physical layer. As for storage network communication, Fibre Channel uses four electrical traces, Serial Attached SCSI (SAS) uses four traces for 1× SAS and eight trances for 2× SAS, PCIe uses from four traces (for 1× PCIe) to sixteen traces (for 4× PCIe). As for communications for parallel computing, InfiniBand 4× uses sixteen traces at the physical layer. In the related art, traces on the midplane boards are dedicated to particular protocols (e.g., traces designed for InfiniBand would not be used for Ethernet, and vice versa). Dedicating midplane board traces to particular protocols limits the implementation flexibility of each midplane board (and thus each enclosure within which a midplane board is installed). For example, a slot design for use with a parallel computing switch device communicating using the InfiniBand protocol could not be used for a network communications switch device communicating using Ethernet in the related art.

In accordance with the various embodiments, traces on the midplane board 22 between the switch device connectors 42 and the server connectors 38 are not dedicated to any particular communications protocol, and indeed may carry signals from differing protocols depending on the type of switch device coupled to the midplane board 22. It follows that the switch device slots (e.g., 44 and 46) are not limited to any particular type of switch device. Moreover, a single-wide slot (which itself may accept switch devices of multiple types) may be considered with a contiguous single-wide slot to form a double-wide slot to accept switch devices having a double-wide form factor, and using more traces for communication. Attention now turns to the midplane board 22 layout to implement the various embodiments.

In accordance with the various embodiments, each switch device connector 42 couples to each server connector 38 by way of electrical traces on the midplane board 22. More particularly, each switch device connector 42 couples to each server connector 38 by way of at least eight electrical traces of the midplane board 22 in a star topology (additional traces, e.g., clock signal traces, may also be used). For an illustrative system having eight switch device connectors 42, sixteen server connectors 38 and eight traces for each server to switch device connection, each switch device connector 42 thus implements 128 connection points or pins (eight pins per connection times 16 server connectors) dedicated to communication between servers and switch devices. Additional pins may be present, for example, to supply power to the switch devices and to allow communication between the switch devices and the enclosure manager 40.

Considering illustrative single-wide slot 44 and its respective connector 42A, a single-wide switch device installed in the single-wide slot 44 thus has the capability of communicating to each and every server in the system over at least eight electrical traces (if the server are half-height servers), and the switch device can communicate to a full-height server over 16 electrical traces (because the full height server couples to two server connectors 38). As for the single-wide switch device and the half-height server, the switch device can communicate using any protocol requiring eight traces or less (e.g., 1000-Base-KX Ethernet (four traces), 10G-Base-KR Ethernet (four traces), Fibre Channel (four traces), 1× Serial Attached SCSI (four traces), 2× Serial Attached SCSI (eight traces), 1× PCIe (four traces) or 2× PCIe (eight traces)). Thus, a single-wide switch device (coupling to one switch device connector 42) could be any now existing or after developed switch device needing eight or fewer traces for communication (e.g., network communications switch device or storage switch device).

As for a single-wide switch device and the full-height server (connecting to two server connectors 38), the switch device can communicate using any communication protocol requiring eight or less traces (e.g., all of those discussed for the single-wide switch device and half-height server, along with 2× PCIe (eight traces) and 2× InfiniBand (eight traces)). A full-height server double the number of connections to the switch devices, compared to a half-height server. Doubling the number of connections doubles the number of ports. Thus, in the case of the single-wide switch device and the full-height server, the switch device may be any of the switch devices discussed with respect to FIG. 1 (network communications, storage or parallel computing switch device), or any switch device type hereinafter developed.

Now consider a double-wide switch device that occupies two single-wide slots (e.g., 44 and 46) and thus couples to two switch device connectors 42. In this illustrative situation, the double-wide switch device has sixteen available traces to each half-height server (coupled to a single server connector 38). In the illustrative case of occupying slots 44 and 46, eight traces of the sixteen are available through switch device connector 42A, and eight traces through switch device connector 42B. A double-wide switch device can communicate using any communication protocol having sixteen traces (e.g., 10G-Base-KX4, 4× PCIe and 4× InfiniBand). As for using a double-wide switch device and a full-height server (coupled to two server connectors 38), the double-wide switch device has 32 available traces for communication, sixteen through each switch device connector 42.

Now consider a switch device that not only couples to two switch device connectors in the same horizontal plane (e.g., 42A and 42B, and thus a double-wide), but also connects to two switch device connectors in contiguous slots (e.g., connectors 42C and 42D, and thus a double-wide, double-high switch device). In these illustrative situations, the switch device has 32 available traces to each half-height server (eight traces each through connectors 42A, 42B, 42C and 42D). As for using a double-wide, double-high switch device and a full-height server (coupled to two server connectors 38), the double-wide, double-high switch device has 64 traces for communication, sixteen traces through each switch device connector 42.

As discussed above, each switch device connector 42 couples to each and every server connector 38. If follows that each switch device coupled within the enclosure 30 likewise has the ability to communicate with each server over at least eight electrical traces, and more traces if either the switch device couples to multiple switch device connectors 42 or the server couples to multiple server connectors 38. However, while each server and switch device may have the ability to communicate, each server may not need to communicate with each switch device. In order to selectively couple the servers to the switch devices, computing systems 1000 in accordance with at least some embodiments use electrical boards (termed mezzanine boards) within each server which allow selectively coupling of the server to switch devices.

FIG. 4 illustrates a simplified computing system 1000 to exemplify the use of mezzanine boards to selectively couple the servers to the switch devices. In particular, FIG. 4 illustrates a server 50 coupled to midplane board 54. The midplane board 54 in turn couples the server to the four illustrative network communications switch devices 56A-D. FIG. 4 also illustrates that midplane board 54 has a plurality of electrical traces 58 (each line representing at least eight traces), and as above the electrical traces 58 couple each switch device 56 to each server connector 52A and 52B.

Inside the illustrative server 50 reside mezzanine connectors 60A and 60B, one mezzanine connector 60 for each server connector 52. In accordance with embodiments of the invention, coupling of the traces between the server connectors 52 and the corresponding mezzanine connectors 60 vary as between server connector and mezzanine connector pairs. In this way mezzanine cards 62A and 62B, having the same configuration, may couple to different switch devices 56 dependent upon which mezzanine connector 60 is used by the mezzanine card 62. In the illustrative situation of FIG. 4, mezzanine connector 60A couples to the server connector 52A and thus the switch devices in order starting with switch device 56A, 56B, and so on. Mezzanine connector 60B, by contrast, couples to the server connector 52B in a different order, such that the mezzanine connector 60B couples to switch device 56C and 56D, and then switch devices 56A and 56B. The illustrative FIG. 4 is not meant as a limitation on the applicability of the connections between the mezzanine connectors and the server connectors; but rather, is merely illustrative of the mechanism of varying connections between the mezzanine connectors and the server connectors.

Still referring to FIG. 4, consider now the two identically configured mezzanine cards 62A and 62B. If the server 50 administrator desires to couple the server 50 to switch devices 56A and 56B, a two-port communication device implemented on the mezzanine card 62 may be coupled to the mezzanine connector 60A. If the administrator also desires to couple the server 50 to switch devices 56C and 56D, the administrator could use a mezzanine card with a different (four port) configuration, or the administrator could use a mezzanine card 62B of identical configuration to that of mezzanine card 62A, yet plug the mezzanine card 62B into a different mezzanine connector 60B. Thus, the differing mezzanine connector configurations and mezzanine boards may allow flexibility in computing system 1000 design by selectively allowing the servers to communicate with selected particular switch device slots. However, in alternative embodiments the servers are hardwired to communicate to particular slots, and thus mezzanine cards are not strictly required. Moreover, the mezzanine cards themselves may be more than just signal passageways, and may contain devices and components to implement communications with the switch devices. For example, in some embodiments the mezzanine cards couple to an expansion bus of the server and implement components to facilitate message transfer from the server to the switch device using the proper protocol.

Attention now turns to assignment of traces to either transmit or receive for particular implemented protocols. In situations where single-wide switch devices are used, the transmit and receive pairs by definition reside within the same switch device connector 42. However, in situations where a double-wide switch devices, or double-wide, double-high switch devices are used, the electrical traces on the midplane board 22 between the switch device and each server span multiple switch device connectors 42. In these situations, and in accordance with at least some embodiments, traces assigned to transmitting from the switch device to the server may be within different connectors than traces assigned to receiving from servers by the switch devices.

FIG. 5 illustrates situations where, in spite of having multiple switch device connectors 42 used by a double-wide switch device, transmit and receive pairs between the switch device and a particular server are grouped within the same connectors. In particular, differential receive pairs are represented by dots (e.g., "••") and differential transmit pairs are represented by crosses (e.g., "XX"). Thus, FIG. 5 shows that for a double-wide switch device using both connectors 42A and 42B, the transmit and receive pairs are grouped within connectors so that single-wide and double-wide switch devices can be interchanged without changing mezzanine cards. In alternative embodiments, the transmit and receive pairs need not necessarily be side-by-side, or in the same connector. FIG. 6 illustrates situations where a double-wide switch device using both connectors 42A and 42B, the transmit and receive pairs may be broken up across the connectors. In particular, for the exemplary four transmit and receive pairs, the receive signal lines may reside in a first connector 42A, and the transmit signal lines may reside within a second connector 42B. Likewise for double-wide, double-high switch devices, the transmit and receive pairs may be divided up among the various connectors. Assignment of transmit/receive pairs in the manner discussed above (for FIG. 6) may aid in reducing cross-talk and skew between communication pairs.

Returning now to FIG. 3. Enclosure manager computer system 40 is responsible for internal operations within the enclosure, such as selectively powering servers, selectively powering switches, controlling power supplies that supply power to the enclosure, and allowing remote administration. In addition to these responsibilities, the enclosure manager computer system 40 also selectively enables devices coupled to the ports at power-on. More particularly, given the flexibility of the types of devices which may be coupled within the enclosure 30, the enclosure manager computer system 40, prior to allowing power-on of any device in the system, communicates with the device to determine the type of device and interoperability (in terms of protocol or trace usage) of the device with the remaining components. The enclosure manager computer system 40 only allows a device to power-on if powering on such a device is safe for that device and the remaining components. Moreover, the enclosure manager computer system 40, based on the communications, is aware of the electrical trace topology between the switch devices and the servers, and may make parameter adjustments within the switch devices and/or the servers to ensure proper operability, such as transmit driver settings to take into account length of the electrical signal lines across the backplane board and correspondingly distance between switch devices and servers.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
a plurality of servers;
a plurality of server connectors on a midplane board, the server connectors couple to the servers;
a first and second switch slots, where each switch slot enables coupling of a switch device to the midplane board;
a first switch connector associated with the first switch slot, wherein the first switch connector is electrically coupled to each of the plurality of server connectors; and
a second switch connector associated with the second switch slot, wherein the second switch connector is electrically coupled to each of the plurality of server connectors;
wherein when the first and second switch slots accept a switch device one each in each switch slot, the switch device in the first switch slot communicates with at least one of the plurality of servers using a communication protocol having a first bandwidth; and
wherein when first and second switch slots accept a single switch device spanning both switch slots, the single switch device communicates with at least one of the plurality of servers using a communication protocol having a second bandwidth, the second bandwidth greater than the first bandwidth.

2. The system as defined in claim 1 wherein the switch devices are at least one selected from the group consisting of: a device that couples at least one of the plurality of servers to a communications network; a device that couples at least one of the plurality of servers to a storage device; and a device that couples to at least one of the plurality of servers for purposes of parallel computing.

3. The system as defined in claim 1 further comprising:
a third and fourth switch slots, where each switch slot enables coupling of a switch device to the midplane board;
wherein the third and fourth switch slots accept switch devices one each in each switch slot, wherein the third and fourth switch slots accept a single switch device spanning both the third and fourth switch slots, and wherein the first, second, third and fourth switch slots accept a single switch device spanning the first, second, third and fourth switch slots.

4. A system, comprising:
a midplane board having a server side and a switch side;
a first and second switch connectors on the switch side, wherein the first and second switch connectors are arranged and constructed to couple one each to switch devices and are to couple to a single switch device utilizins both switch connectors;
a first, second, third and fourth server connectors on the server side, wherein the server connectors couple to servers;
wherein the first switch connector couples to each server connector by way of at least eight electrical traces;
wherein the second switch connector couples to each server connector by way of at least eight electrical traces;
wherein when the first and second switch connectors couple one each to switch devices, the switch device couple to the first switch connector communicates with at least one of the plurality of servers over the at least eight electrical traces using a first communication protocol; and
wherein when first and second switch connectors accept a single switch device spanning both switch connectors, the single switch device communicates with at least one of the plurality of servers over the at least eight electrical traces of the first switch connector using a second communication protocol.

5. The system as defined in claim 4 further comprising:
a third and fourth switch connectors on the switch side, wherein each switch connector couples to a switch device;
wherein the third switch connector couples to each server connector by way of eight electrical traces; and
wherein the fourth switch connector couples to each server connector by way of at least eight electrical traces.

6. The system as defined in claim 5 wherein the third and fourth switch connectors are arranged and constructed such that the third and fourth switch connectors couple one each to switch devices.

7. The system as defined in claim 5 wherein the third and fourth switch connectors are arranged and constructed such that the third and fourth switch connectors couple to the single switch device.

8. The system as defined in claim 7 wherein the first, second, third and fourth switch connectors are arranged and constructed such that the first, second, third and fourth switch connectors couple to the single switch device utilizing the first, second, third and fourth switch connectors.

9. The system as defined in claim 1, wherein switch devices comprise switch devices selected from a group consisting of: switch devices that couple servers to a communications network; switch devices that couple servers to storage devices; and switch device that couple servers to other servers for purposes of parallel computing.

* * * * *